US 9,752,797 B2

(12) United States Patent
Roetker

(10) Patent No.: US 9,752,797 B2
(45) Date of Patent: Sep. 5, 2017

(54) WATER HEATER WITH INTEGRATED SORPTION REACTOR

(71) Applicant: General Electric Company, Schenectady, NY (US)

(72) Inventor: John Joseph Roetker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/358,311

(22) PCT Filed: Oct. 9, 2013

(86) PCT No.: PCT/US2013/064040
§ 371 (c)(1),
(2) Date: May 15, 2014

(87) PCT Pub. No.: WO2015/053764
PCT Pub. Date: Apr. 16, 2015

(65) Prior Publication Data
US 2016/0273802 A1    Sep. 22, 2016

(51) Int. Cl.
*F24H 7/04* (2006.01)
*F25B 17/02* (2006.01)
(Continued)

(52) U.S. Cl.
CPC ............ *F24H 7/04* (2013.01); *F24H 1/208* (2013.01); *F24H 4/04* (2013.01); *F25B 17/02* (2013.01);
(Continued)

(58) Field of Classification Search
CPC ............ F24H 7/04; F24H 1/208; F25B 17/08
See application file for complete search history.

(56) References Cited

U.S. PATENT DOCUMENTS 2,363,399 A * 11/1944 Coons ................. F25B 15/10
                                                       62/110
3,527,060 A *  9/1970 Kruggel ............... F25B 15/04
                                                       62/140
(Continued)

FOREIGN PATENT DOCUMENTS

CN         202274628 U  *  6/2012
JP         2006/132867       5/2006

OTHER PUBLICATIONS

CN 202274628 U—machine translation.*
PCT/US13/64048 Search Report Mar. 4, 2014.

*Primary Examiner* — Alissa Tompkins
*Assistant Examiner* — Nathaniel Herzfeld
(74) *Attorney, Agent, or Firm* — Dority & Manning, P.A.

(57) ABSTRACT

A water heater is provided having a sorption based reactor that is integrated into a water tank. The water heater is operated between an adsorption cycle and a desorption cycle. During the endothermic desorption cycle, a primary heat exchanger is used to transfer heat from a condensing primary fluid that was vaporized from the sorbate to water in the tank. A charging heat transfer system supplies heat for the vaporization during endothermic desorption cycle. During the exothermic adsorption cycle, a secondary heat exchanger is used along with a secondary fluid to transfer heat generated by adsorption of the primary fluid to water in the tank. An evaporator provides for vaporization of the primary fluid during the adsorption cycle. Substantial improvements in energy efficiency can be achieved.

20 Claims, 3 Drawing Sheets

(51) Int. Cl.
  *F25B 30/04*   (2006.01)
  *F24H 1/20*    (2006.01)
  *F24H 4/04*    (2006.01)
  *F25B 17/08*   (2006.01)

(52) U.S. Cl.
  CPC .............. *F25B 17/08* (2013.01); *F25B 30/04* (2013.01); *F24D 2200/126* (2013.01); *F25B 2339/047* (2013.01); *Y02B 30/64* (2013.01)

(56) References Cited

U.S. PATENT DOCUMENTS

| | | | | |
|---|---|---|---|---|
| 4,596,122 | A * | 6/1986 | Kantner | F25B 33/00 62/141 |
| 4,637,218 | A * | 1/1987 | Tchernev | F24J 2/28 62/106 |
| 4,713,944 | A * | 12/1987 | Januschkowetz | F25B 17/08 62/239 |
| 5,272,891 | A * | 12/1993 | Erickson | F24H 4/04 62/477 |
| 5,598,721 | A * | 2/1997 | Rockenfeller | C09K 5/00 62/480 |
| 5,906,109 | A * | 5/1999 | Dieckmann | F24H 4/04 237/2 B |
| 6,807,820 | B2 * | 10/2004 | Aikawa | B60H 1/00492 62/238.3 |
| 2010/0281899 | A1 | 11/2010 | Garrabrant | |
| 2016/0231034 | A1 * | 8/2016 | Roetker | F25B 17/02 |

* cited by examiner

WATER HEATER WITH INTEGRATED SORPTION REACTOR

FIELD OF THE INVENTION

The subject matter of the present disclosure relates generally to a water heater that uses a sorption based reactor for heating the water.

BACKGROUND OF THE INVENTION

Water heaters can provide for the heating and storage of water to be used in e.g., a residential or commercial structure. A typical construction includes a water tank that is surrounded by a jacket and is insulated. A heat source is provided for increasing the temperature of water in the tank. The heat source is commonly based on e.g., gas burners or electrically-resistant coils.

In such constructions, heat created from combustion or the resistance to a current flow is provided directly to the water tank. With gas burners, for example, the burner is located just below the bottom wall of the water tank. Combustion of a liquid or gaseous fuel provides heat that is conducted through the wall of the water tank. In the case of electrically-resistant coils, one or more such coils are typically inserted through a wall of the tank and into the water. Heat generated by the resistance to current flow is transferred to the water.

While substantial improvements have been achieved, there is still a need for improvement in water heater efficiency.

One technology that has been proposed for improving water heater efficiency is the use of sorption based water heaters. For such water heaters to be profitable, such need to be simple, robust, highly efficient, affordable and easy to integrate into water systems where conventional water heaters have previously been used.

Many sorption based devices work according to a batch process, which means that they operate intermittently. These sorption based devices usually include two main components: a reactor and another component that acts as either a condenser or evaporator depending on the phase of the process. In these types of devices, during a charging phase, the reactor takes in heat at high temperature and the condenser releases heat at relatively low temperatures. During the discharging phase, the reactor releases heat at low relatively temperatures and the evaporator absorbs heat at much lower temperatures. In each of these two phases, the device needs to exchange heat with the environment or ambient conditions. To supply or release heat at different temperatures using the same component as both a heat exchanger and a condenser, prior sorption based devices often use a complex system of valves, pumps, and pipes that act as an auxiliary system for the sorption device. Thus, these prior devices are typically more complex and have moving parts that result in higher electricity consumption, greater risk of leakage, and increased risk of repair or maintenance.

Accordingly, improvement is needed in sorption based devices and in water heaters using such devices.

BRIEF DESCRIPTION OF THE INVENTION

The present invention provides a water heater having a sorption based reactor that is integrated into a water tank. The water heater is operated between an adsorption cycle and a desorption cycle. During the endothermic desorption cycle, a primary heat exchanger is used to transfer heat from a condensing primary fluid that was vaporized from the sorbate to water in the tank. A charging heat transfer system supplies heat for the vaporization during endothermic desorption cycle. During the exothermic adsorption cycle, a secondary heat exchanger is used along with a secondary fluid to transfer heat generated by adsorption of the primary fluid to water in the tank. An evaporator provides for vaporization of the primary fluid during the adsorption cycle. Substantial improvements in energy efficiency can be achieved. Additional aspects and advantages of the invention will be set forth in part in the following description, may be apparent from the description, or may be learned through practice of the invention.

In one exemplary embodiment, the present invention provides a water heater that includes a tank having a volume for storing water. The tanks also defines a cavity. A primary heat transfer system is included in which a primary fluid is recirculated. The primary heat transfer system includes a reactor located within the cavity and a sorbate located within the reactor. A primary heat exchanger is positioned within the volume of the tank and is in fluid communication with the reactor to receive vaporized primary fluid that is endothermically desorbed from the sorbate. An evaporator is in fluid communication with the primary heat exchanger to receive primary fluid condensed in the primary heat exchanger. The evaporator is in fluid communication with the reactor to provide primary fluid vaporized by the evaporator to the reactor.

This exemplary water heater also includes a secondary heat transfer system in which a secondary heat transfer fluid is recirculated. The secondary heat transfer system includes an auxiliary heat exchanger positioned within the reactor and configured for transferring heat energy to the secondary fluid. A secondary heat exchanger is positioned within the volume of the tank and configured for transferring heat from the secondary fluid to the water in the tank. The secondary heat exchanger is in fluid communication with the auxiliary heat exchanger and is configured to receive liquid secondary fluid from the auxiliary heat exchanger that is heated by exothermic adsorption of primary fluid by the sorbate. The secondary heat exchanger is also configured to return to the auxiliary heat exchanger liquid secondary fluid that has transferred heat to the water in the tank.

This exemplary water heater also includes a charging heat transfer system in which the charging fluid is recirculated. The charging heat transfer system includes a heater configured for vaporizing the charging fluid and a reactor heat exchanger positioned within the reactor and in fluid communication with the heater. The reactor heat exchanger is configured to receive vaporized charging fluid from the heater and to return condensed charging fluid to the heater.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
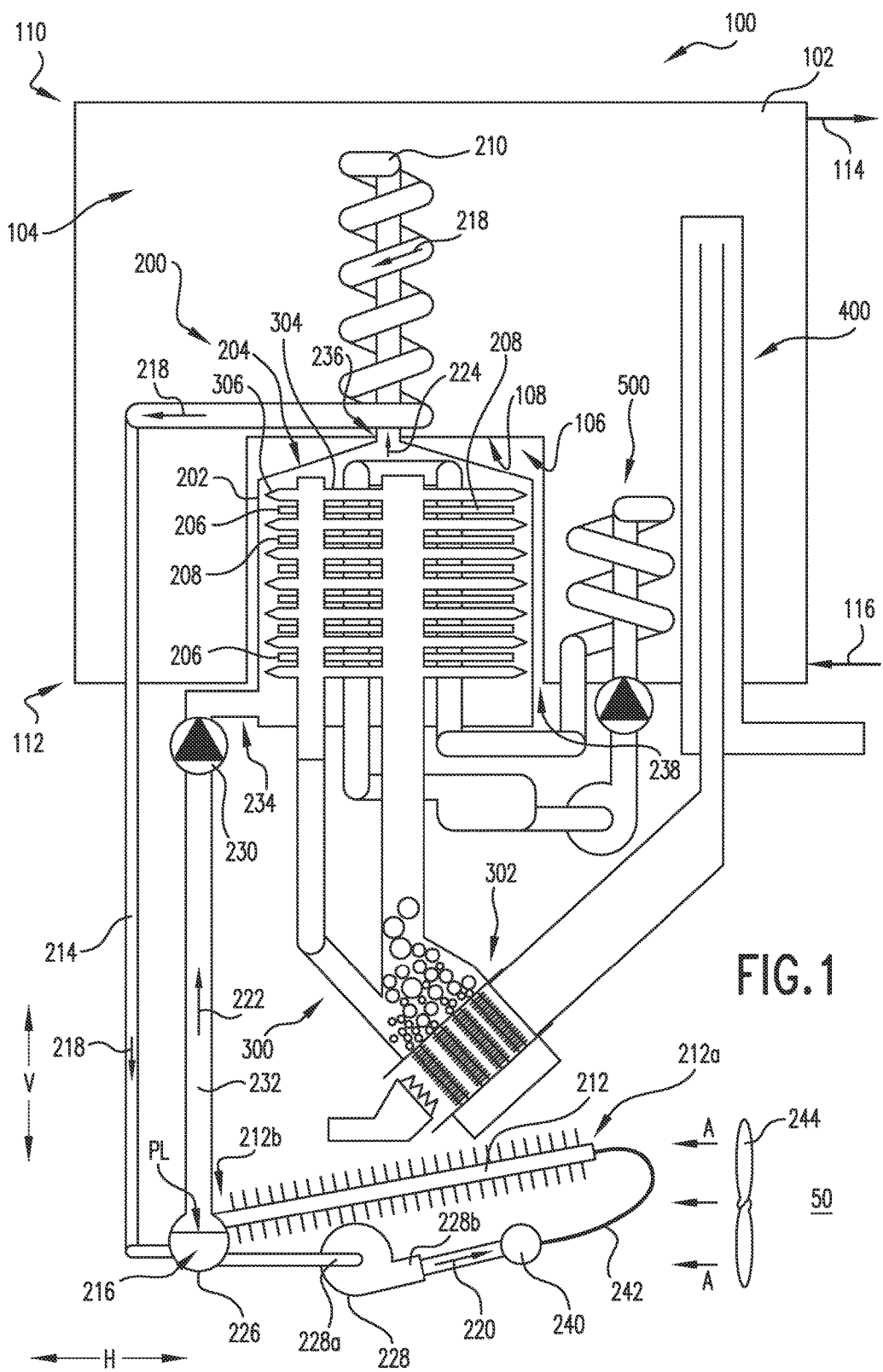
FIGS. 1, 2, and 3, each provide a schematic view of an exemplary embodiment of a water heater of the present invention. Different aspects of operation of the exemplary water heater are depicted throughout these figures.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Schematic representations of an exemplary embodiment of a water heater 100 of the present invention are set forth in the figures. Beginning with FIG. 1, water heater 100 includes a tank 102 having a volume 104 for water storage and heating. Tank 102 extends along vertical direction V between a top 110 and a bottom 112. Tank 102 includes a recess or cavity 106 in bottom 112 that defines an inside surface 108. An inlet 116 is provided for the inflow of water to be heated and an outlet 114 is provided for the outflow of heated water. Outlet 114 and inlet 116 can be connected with e.g., a residential or commercial water system in a home or other structure.

For this exemplary embodiment, water heater 100 also includes a primary heat transfer system 200, a charging heat transfer system 300, an exhaust gas heat transfer system 400, and a secondary heat transfer system 500. Water heater 100 is operated by shifting between two cycles: 1) an adsorption cycle where heat is released from exothermic adsorption of a primary fluid onto a sorbate 206, and 2) a desorption cycle requiring heat for the endothermic desorption of the primary fluid from sorbate 206. A further description of each heat transfer system as well as the structure and operation of water heater 100 in these two cycles now follows.

Continuing with FIG. 1, primary heat transfer system 200 is used to recirculate a primary fluid 216 between several components that are in fluid communication with each other. As used herein, "fluid" refers to vapor and/or liquid states unless otherwise specified as a vapor or as a liquid. As also used herein, components described as being in "fluid communication" means that a fluid can travel between such components that are either directly connected or may be connected through piping, tubing, flow channels, other components, and combinations thereof unless otherwise specified.

Primary heat transfer system 200 includes an integrated sorption reactor 202—i.e., reactor 202 is positioned within the cavity 106 of tank 102. In one exemplary embodiment, reactor 202 is positioned with a slight gap 238 between reactor 202 and the inside surface 108 of cavity 106 defined by tank 102. In other embodiments, reactor 202 may be formed integrally with tank 102 such that reactor 202 is embedded within cavity 106. Either construction allows for thermal communication between reactor 202 and tank 102 such that heat can be transferred to water in the volume 104 of tank 102.

A sorbate 206 is located within reactor 202. As used herein, "sorbate" refers to material that can be combined with the primary fluid 216 to create an exothermic reaction. Conversely, the sorbate can be heated to remove the primary fluid 216 in an endothermic reaction. By way of example, sorbate 206 may be a salt such as lithium chloride or lithium bromide while the primary fluid may be a relatively volatile liquid such as water. In still another embodiment, sorbate 206 is at least one metal salt selected from the group consisting of LiCl, LiBr, LiI, $MgCl_2$, $MgBr_2$, $MgI_2$, $CaCl_2$, $CaBr_2$, $CaI_2$, $SrI_2$, KOH, NaOH, $ZnCl_2$, $ZnBr_2$, $ZnI_2$, $AlCl_3$, $AlBr_3$, and $AlI_3$. In another alternative embodiment, sorbate 206 is at least one metal salt selected from the group consisting of $MgCl_2$, $MgBr_2$, LiCl, $CaCl_2$, $CaBr_2$, $ZnCl_2$, and NaOH.

For the exemplary embodiment shown in the figures, sorbate 206 is provided in a plurality of plates 208 positioned in layers along vertical direction V in an alternating manner with a plurality of heat transfer plates 306 of a reactor heat exchanger 304 (FIG. 2), which will be more fully described below. Plates 208 act as membranes that contain sorbate 206 while allowing primary fluid to pass in or out and thereby interact with sorbate 206. The adsorption of primary fluid onto sorbate 206 (i.e., an adsorption cycle) is an exothermic event that generates heat. Conversely, the desorption of primary fluid from sorbate 206 (i.e., a desorption cycle) requires the addition of heat (from charging heat transfer system 300), which liberates primary fluid as a vapor 224 from sorbate 206.

During the desorption cycle, a flow 224 of vaporized primary fluid (i.e., steam) rises to bonnet 204 and exits through reactor outlet 236. Primary heat transfer system 200 includes a primary heat exchanger 210 that is positioned within the volume 104 of tank 102. Primary heat exchanger 210 is in fluid communication with reactor 202 by outlet 236 and thereby receives the flow 224 of vaporized primary fluid created by the endothermic desorption from sorbate 206. The flow 224 of vaporized primary fluid travels through primary heat exchanger 210 and transfers heat to the water in tank 102 as it cools and condenses. The resulting flow 218 of condensed—i.e., liquid—primary fluid 216 flows under the force of gravity vertically down through primary heat exchanger 210, through condensate return leg 214, and into a primary storage vessel 226 where it is collected as a liquid volume of primary fluid 216.

During the desorption cycle, a primary valve 230 remains closed to prevent flow along vapor return leg 232 between reactor 202 and an evaporator 212 and primary storage vessel 226. Both evaporator 212 and primary storage vessel 226 are in fluid communication with primary heat exchanger 210. A primary pump 228 remains off during the desorption cycle.

The desorption cycle is continued until all or a certain portion of primary fluid has been desorbed from sorbate 206. Such determination can be made by monitoring the level PL of primary fluid 216 in primary storage vessel 226 and/or by monitoring the temperature at or near the sorbate 206 in reactor 202. For example, the temperature at or near sorbate 206 would be substantially constant during desorption and then would begin to increase as desorption of the primary fluid is completed.

During an adsorption cycle, primary valve 230 is opened to allow for fluid communication between evaporator 212 and reactor 202. More particularly, opening of primary valve 230 allows a flow 222 of primary fluid in the form of vapor (from evaporator 212) into reactor 202 through reactor inlet 234. Additionally, primary pump 228 is activated. As shown in FIG. 1, primary pump 228 has a primary pump inlet 228a that is in fluid communication with primary storage vessel 226 to draw condensed primary fluid 216 therefrom. By way of distribution manifold 240 and connector 242, primary pump outlet 228b is in fluid communication the evaporator 212 to provide a flow 220 of liquid primary fluid thereto.

Once pumped to evaporator 212, at least a portion of flow 220 of primary fluid is vaporized. For example, in one embodiment, the primary fluid is water that is at or near a vacuum pressure condition within primary heat transfer system 200—thereby increasing its volatility. For example, water might be used as a primary fluid at a pressure of less than about 2 millibars. Under such conditions, the surrounding atmosphere or ambient 50 can provide heat for the vaporization of primary liquid 216 in evaporator 212. A fan 244 can be used to provide a forced air flow (arrows A) to improve heat transfer with the ambient 50. Accordingly evaporator 212 provides a flow 222 of vaporized primary fluid along vapor return leg 232, through an opened primary valve 230, and into reactor 202.

Liquid that is not vaporized in evaporator 212 drains into primary storage vessel 226. For this purpose, evaporator 212 may be elevated along vertical direction V higher than primary storage vessel 226 but lower than primary heat exchanger 210 so as to provide a gravity flow of liquid primary fluid 216 back into primary storage vessel 226. Evaporator 212 may also be placed at non-zero angle θ (FIG. 2) from the horizontal direction H as shown with the inlet 212a positioned higher than the outlet 212b to further facilitate the return of liquid primary fluid 216 back into primary storage vessel 226. While activated, primary pump 228 will recycle this liquid primary fluid 216 back into evaporator 212.

As stated, evaporator 212 is in fluid communication with reactor 202 to provide vaporized primary fluid flow 222 back into reactor 202. Therein, this vaporized primary fluid can undergo exothermic adsorption onto sorbate 206, which generates heat that can be transferred to water in tank 102 by secondary heat transfer system 500 as further described below. Once sorbate 206 is substantially fully saturated by adsorption of the primary fluid, the adsorption cycle is ended by closing primary valve 230 and deactivating primary pump 228. The desorption cycle can then be repeated as described above. The amount of saturation of the sorbate 206 during the adsorption cycle can be determined by monitoring the level PL of primary fluid 216 in primary storage vessel 226 and/or by monitoring the temperature at or near the sorbate 206 in reactor 202.

Figure 2:
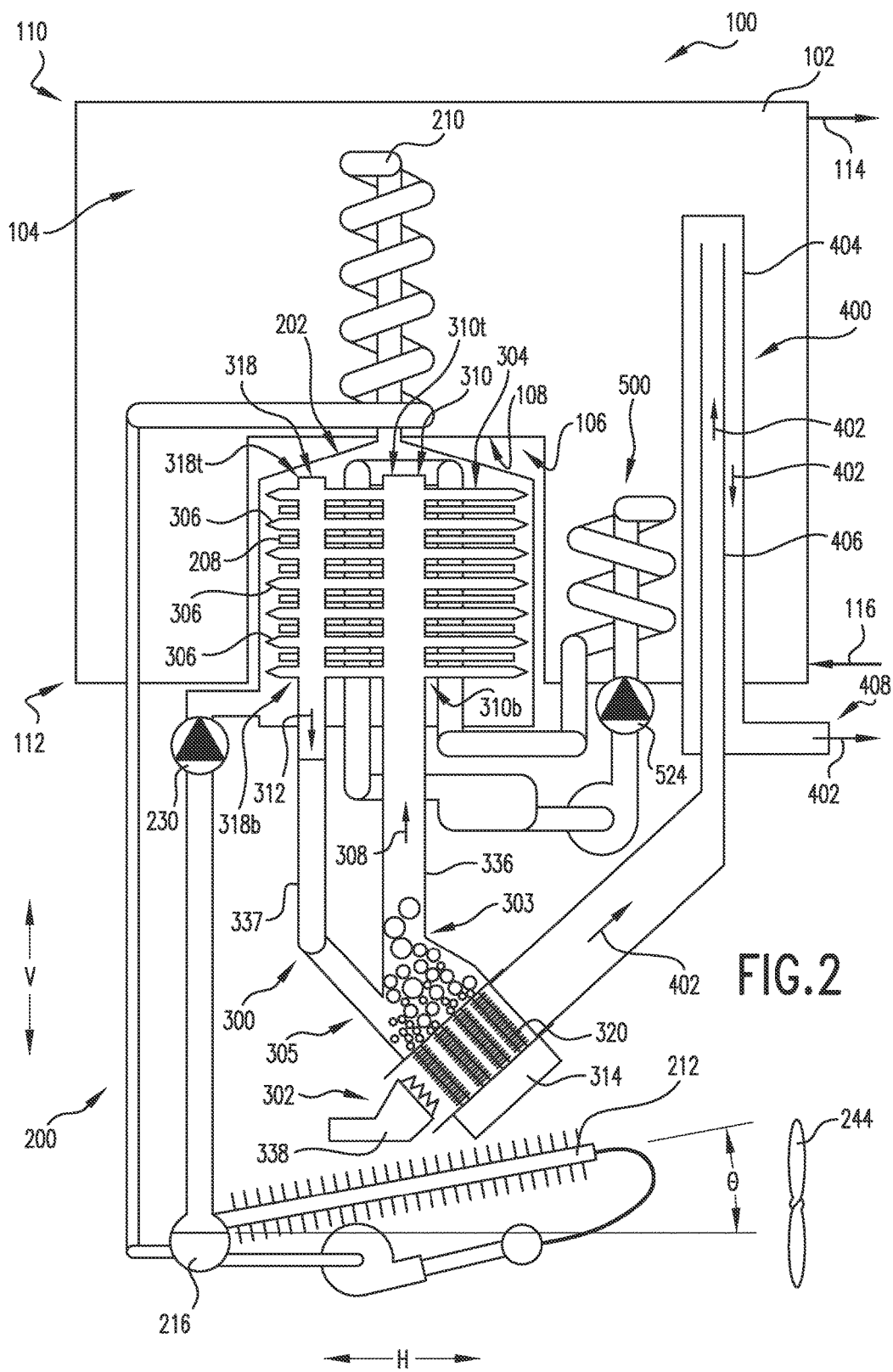

Turning now to FIG. 2, a charging heat transfer system 300 is used to recirculate a charging fluid 314 between several components that are in fluid communication with each other. During the desorption cycle, a heater 302 is positioned at the bottom of system 300 (i.e. vertically lower than reactor 202) and is used to vaporize the charging fluid that collects therein. More particularly, heater 302 uses a boiler 320 to provide a flow 308 of vaporized charging fluid to reactor heat exchanger 304. Therein, heat is transferred to the sorbate 206 to endothermically desorb primary fluid from the sorbate 206 as previously described. Reactor heat exchanger 304 includes plates 306 alternating with plates 208 to improve such heat transfer. Upon releasing its latent heat, the charging fluid condenses and provides a return flow 312 to heater 302 by gravity feed through line 337.

Notably, as shown in the figures, primary fluid is recirculated within primary heat transfer system 200, charging fluid is recirculated within charging heat transfer system 300, and secondary fluid is recirculated within secondary heat transfers system 500. Each system remains closed in that primary fluid, secondary fluid, and charging fluid are not mixed during the heat transfer operations described. Thus, reactor heat exchanger 304 is positioned with reactor 202 but provides a flow path for charging fluid that is separated from the flow path of primary fluid in reactor 202. While water can be used for primary fluid, charging fluid, and secondary fluid, the pressures within the primary heat transfer system 200 and secondary heat transfer system can be much different so as to determine the level of volatility.

Continuing with FIG. 2, plates 306 of reactor heat exchanger 304 extend between a first leg 310 and a second leg 318 of reactor heat exchanger 304. First leg 310 has a top portion 310t and a bottom portion 310b. Bottom portion 310b is in fluid communication with heater 302 through heater outlet 303 to receive a flow 308 of vaporized charging fluid therefrom. Second leg 318 has a top portion 318t and a bottom portion 318b. Bottom portion 318b is in fluid communication with heater 302 through a heater inlet 305 and line 337. Charging system 300 is activated during the desorption cycle and deactivated during the adsorption cycle.

Figure 3:
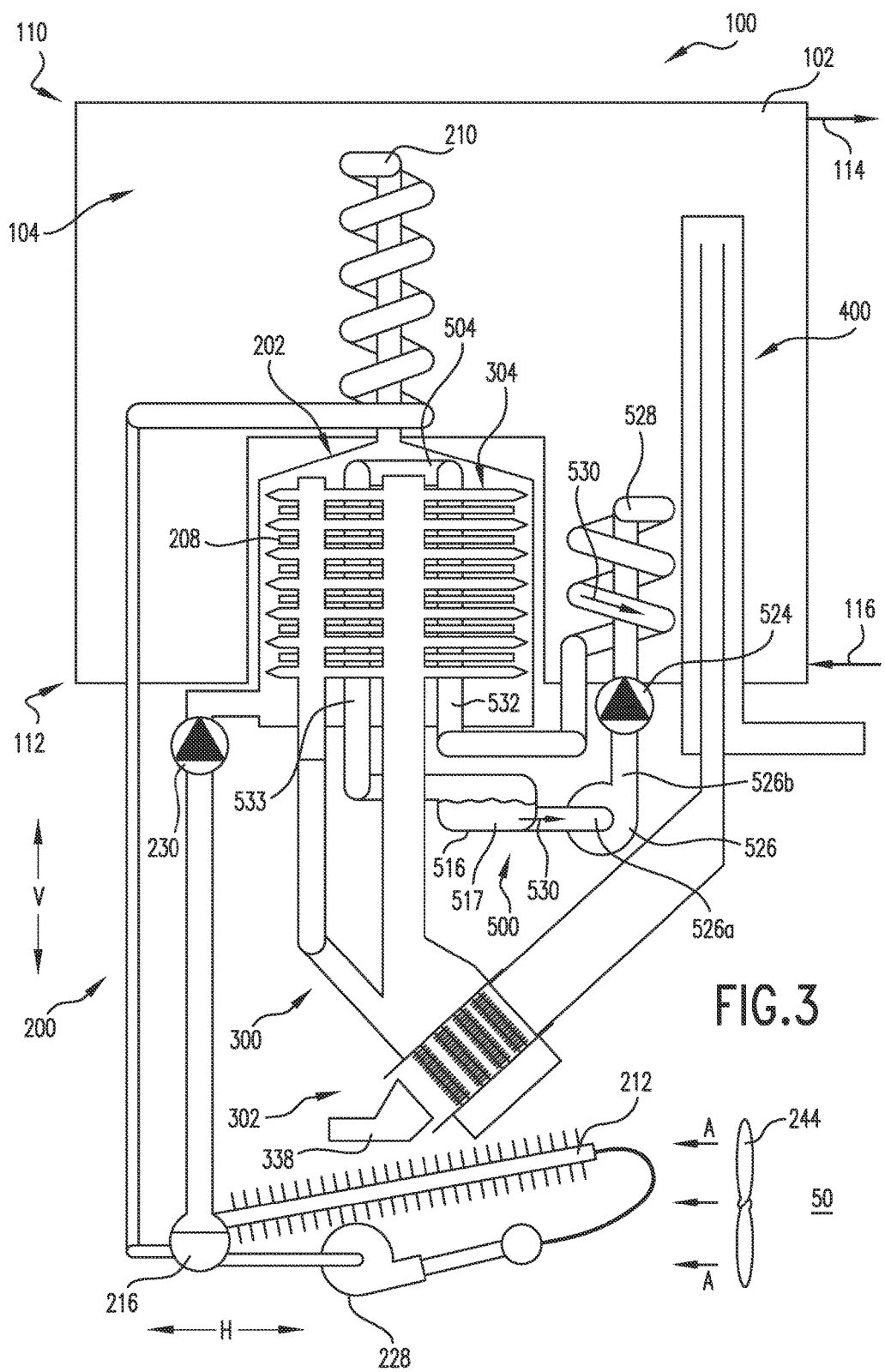

Referring now to FIG. 3, a secondary heat exchanger 528 is positioned within volume 104 of tank 102 so that heat can be exchanged with water in tank 102. Secondary heat exchanger 528 is in fluid communication with an auxiliary heat exchanger 504 to receive secondary fluid heated by the exothermic adsorption of primary fluid onto sorbate 206 during the adsorption cycle. Secondary heat exchanger 528 is also in fluid communication with the auxiliary heat exchanger 504 to return liquid secondary fluid after the secondary fluid has transferred heat to water in tank 102.

During the desorption cycle, a secondary valve 524 remains closed and a secondary pump 526 remains off. Once the desorption cycle ends, secondary valve 524 is opened and secondary pump 526 is activated. Secondary pump 526 has a secondary pump inlet 526a that is in fluid communication with a secondary storage vessel 516 and a secondary pump outlet 526b that is in fluid communication with a secondary heat exchanger 528.

When activated during the adsorption cycle, secondary pump 526 causes a secondary fluid flow 530 from secondary storage vessel 516 to flow into secondary heat exchanger 528. While travelling through second heat exchanger 528, secondary fluid flow 530 transfers heat to water in tank 102. After exiting secondary heat exchanger 528, secondary fluid flows into a riser 532 of auxiliary heat exchanger 504 that extends upwardly along vertical direction V. Riser 532 provides fluid to a return 533 of auxiliary heat exchanger 504 that feeds secondary fluid back into secondary storage vessel 516.

While travelling through auxiliary heat exchanger 504, heat is transferred to the secondary fluid from the exothermic adsorption of primary fluid onto sorbate 206. Secondary fluid is then collected in secondary storage tank 516 for recirculation to secondary heat exchanger 528 to heat water in tank 102 as previously described.

Accordingly, water heater 100 operates by shifting between a desorption cycle and an adsorption cycle. During the desorption cycle, valves 230 and 524 remain shut while pumps 228 and 526 remain off or inactive. During the adsorption cycle, valves 230 and 524 are both opened while pumps 228 and 526 are activated. In one exemplary embodiment, the operation of the valves and pumps of water heater 100 are controlled by one or more processors or controllers. Such controller may include a memory and one or more microprocessors, CPUs or the like, such as general or special purpose microprocessors operable to execute programming instructions or micro-control code associated with operation of water heater 100. The memory may represent random access memory such as DRAM, or read only memory such as ROM or FLASH. In one embodiment, the processor executes programming instructions stored in memory. The memory may be a separate component from the processor or may be included onboard within the processor. The controller may be positioned in a variety of locations throughout water heater 100. The controller can also be used to activate heater 302 along with the previously described valves and pumps. The controller may also receive temperature information from one or more temperature sensors. Such temperature information may include e.g., the temperature of water in tank 102 and of the sorbate 106. The controller may also receive fluid level information from storage vessels 226 and 516.

Returning to FIG. 2, heater 302 may utilize a fuel burner 338 to provide heat to a boiler 320 for vaporizing secondary fluid 314. The combustion of such fuel creates an exhaust gas flow 402 that is used by an exhaust gas heat transfer system 400 to heat water in tank 102. An exhaust gas heat exchanger 404 is positioned in the volume 104 of tank 102 for transferring heat to the water. A vent 406 receives exhaust gas flow 402 from fuel burner 338/boiler 320 and supplies such exhaust into the exhaust gas heat exchanger 404. Vent 406 extends vertically upward through exchanger 404 so that a counterflow is created therethrough as shown. After passing through exchanger 404, the exhaust gas flow exits through outlet 408.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater, comprising:
   a tank having a volume for storing water, the tank also defining a cavity;
   a primary fluid;
   a primary heat transfer system in which the primary fluid is recirculated, the primary heat transfer system comprising:
      a reactor located within the cavity;
      a sorbate located within the reactor;
   a primary heat exchanger positioned within the volume of the tank and in fluid communication with the reactor to receive vaporized primary fluid that is endothermically desorbed from the sorbate;
   an evaporator in fluid communication with the primary heat exchanger to receive primary fluid condensed in the primary heat exchanger, the evaporator in fluid communication with the reactor to provide primary fluid vaporized by the evaporator to the reactor;
   a secondary fluid;
   a secondary heat transfer system in which the secondary heat transfer fluid is recirculated, the secondary heat transfer system comprising:
      an auxiliary heat exchanger positioned within the reactor and configured for transferring heat energy to the secondary fluid;
      a secondary heat exchanger positioned within the volume of the tank and configured for transferring heat from the secondary fluid to the water in the tank, the secondary heat exchanger in fluid communication with the auxiliary heat exchanger and configured to receive liquid secondary fluid from the auxiliary heat exchanger that is heated by exothermic adsorption of primary fluid by the sorbate, the secondary heat exchanger also configured to return to the auxiliary heat exchanger liquid secondary fluid that has transferred heat to the water in the tank;
   a charging fluid;
   a charging heat transfer system in which the charging fluid is recirculated, the charging heat transfer system comprising
      a heater configured for vaporizing the charging fluid;
      a reactor heat exchanger positioned within the reactor and in fluid communication with the heater, the reactor heat exchanger configured to receive vaporized charging fluid from the heater and return condensed charging fluid to the heater,
   wherein the auxiliary heat exchanger and the reactor heat exchanger are in direct thermal communication within the cavity.

2. The water heater of claim 1, wherein the tank defines a bottom and a top, and wherein the cavity is located in the bottom of the tank.

3. The water heater of claim 1, wherein the secondary heat transfer system further comprises a secondary storage vessel in fluid communication with the auxiliary heat exchanger to receive liquid secondary fluid from the auxiliary heat exchanger.

4. The water heater of claim 3, wherein the secondary heat transfer system further comprises a secondary pump having a secondary pump inlet configured for receiving secondary fluid from the secondary storage vessel, the secondary pump also having a secondary pump outlet configured for providing a flow of secondary fluid through the secondary heat exchanger.

5. The water heater of claim 4, wherein the secondary heat transfer system further comprises a secondary valve configured for selectively controlling the flow of secondary fluid between the secondary storage vessel and the secondary heat exchanger.

6. The water heater of claim 5, wherein the secondary valve is positioned in a flow of secondary fluid that is between the secondary heat exchanger and the secondary pump.

7. The water heater of claim 3, wherein the reactor heat exchanger comprises a first leg having a top portion and a bottom portion, the bottom portion of the first leg in fluid communication with the heater to receive vaporized secondary fluid from the heater.

8. The water heater of claim 7, wherein the reactor heat exchanger comprises a second leg having a top portion and a bottom portion, the bottom portion of the second leg in fluid communication with the heater to return condensed secondary fluid to the heater.

9. The water heater of claim 1, wherein the heater comprises:
   a fuel burner; and
   a boiler for receiving heat from the fuel burner and vaporizing the secondary liquid.

10. The water heater of claim 9, further comprising:
an exhaust gas heat exchanger positioned in the volume of the tank and configured to heat the liquid in the tank using exhaust gas from the fuel burner; and
a vent that receives exhaust from the fuel burner and supplies the exhaust to the exhaust gas heat exchanger.

11. The water heater of claim 1, wherein the primary heat transfer system further comprises a primary storage vessel in fluid communication with the primary heat exchanger to receive condensed primary fluid from the primary heat exchanger.

12. The water heater of claim 11, wherein the primary storage vessel is also in fluid communication with the evaporator to receive liquid primary fluid from the evaporator.

13. The water heater of claim 11, wherein the evaporator is positioned at a non-zero angle from horizontal and higher than the primary storage vessel so as cause condensed primary fluid to drain from the evaporator into the primary storage vessel.

14. The water heater of claim 11, further comprising a primary pump having a primary pump inlet configured for receiving primary fluid from the primary storage vessel, the primary pump also having a primary pump outlet configured for providing a flow of primary fluid to the evaporator.

15. The water heater of claim 14, wherein the primary heat transfer system further comprises a primary valve for selectively controlling the flow of primary fluid between the reactor and the evaporator.

16. The water heater of claim 1, wherein the evaporator is positioned at a vertical location that is lower than the primary heat exchanger such that condensed primary fluid from the primary heat exchanger flows under force of gravity to the evaporator.

17. The water heater of claim 1, wherein a gap is defined between the reactor and the cavity of the tank.

18. The water heater of claim 1, wherein the reactor heat exchanger defines a plurality of heat transfer plates, and wherein the sorbate is positioned in an alternating manner between the heat transfer plates.

19. The water heater of claim 1, wherein the reactor heat exchanger comprises a first leg and a second leg, each leg extending along a vertical direction, and where the heater comprises a heater inlet in fluid communication with the second leg and where the heater comprises a heater outlet in fluid communication with the first leg.

20. The water heater of claim 1, wherein the heater is positioned vertically lower than the reactor heat exchanger such that condensed charging fluid flows by gravity from the second leg to the heater.

* * * * *